3,808,184
METHOD OF REDUCING POLYMERIZATION OF VINYL CHLORIDE IN A MONOMER RECOVERY SYSTEM

Krishnakant K. Sheth, West Caldwell, N.J., and John P. Stallings and William M. Reiter, Mentor, Ohio, assignors to Universal PVC Resins, Inc., Plainesville, Ohio
No Drawing. Filed June 14, 1972, Ser. No. 262,850
Int. Cl. C08f 1/88
U.S. Cl. 260—92.8 A                 9 Claims

ABSTRACT OF THE DISCLOSURE

In the polymerization of vinyl chloride, unreacted monomer recovered after polymerization is prevented from polymerizing in the recovery system by a nontoxic, water-miscible, vinyl chloride-immiscible polymerization inhibitor having a high boiling point, such as triethanol amine, added to the unreacted monomer in the recovery system.

BACKGROUND OF THE INVENTION

In the polymerization of vinyl chloride in an aqueous medium, unreacted monomer is recovered after polymerization for recycle. The monomer is recovered through a recovery system wherein the vinyl chloride is separated from entrained water and condensed. A typical recovery system comprises, in series, a vacuum pump, a compressor, an impingement separator, and a condenser. The vacuum pump is usually bypassed initially when the pressure of the vinyl chloride is relatively high. The vacuum pump is then used to draw remaining monomer from the reactor to the compressor. After being compressed, the vinyl chloride is passed through an impingement separator wherein entrained water is separated out. The vinyl chloride is then condensed to a liquid in the condenser, wherein additional water is separated from the vinyl chloride.

A major problem associated with such recovery of vinyl chloride is polymerization of the vinyl chloride in the recovery system, which results in fouling of the equipment and conduits comprising the recovery system. Fouling tends to be most severe downstream from the compressor.

It is an object of this invention to provide a method of reducing polymerization of vinyl chloride in monomer recovery systems.

SUMMARY OF THE INVENTION

We have found that when vinyl chloride is polymerized in an aqueous medium and unreacted vinyl chloride is recovered after polymerization through a recovery system wherein the vinyl chloride is separated from entrained water and condensed, polymerization of vinyl chloride in the recovery system is substantially reduced by adding to the vinyl chloride in the recovery system a nontoxic, water-miscible, vinyl chloride-immiscible polymerization inhibtor having a boiling point greater than about 150° C., preferably greater than about 200° C.

Since the inhibitor is miscible in water and immiscible in vinyl chloride, it is retained in the water separated from the vinyl chloride and thereby removed from the vinyl chloride. It is essential that the inhibitor be removed from the vinyl chloride before it is recycled to the reactor. If the inhibitor were not removed, it would interefere with polymerization of recycled vinyl chloride in the reactor.

It is also essential that the inhibitor be nontoxic because disposal of the large amount of water recovered in the recovery system would pose a serious pollution problem if the water contained a toxic material. As used herein the term "nontoxic" means substantially not toxic to aquatic life at a concentration of up to 100 parts per million in water.

The boiling point of the inhibitor is also important because the more volatile an inhibitor is, the more it tends to be carried over in the vinyl chloride vapor in the recovery system.

Suitable inhibitors include alkanol amines having the formula $R_1R_2N(CH_2)_nOH$ wherein $n$ is 2 to 4 and $R_1$ and $R_2$ are independently hydrogen, an alkyl group of 1 to 4 carbon atoms, or an alkanol group of 2 to 4 carbon atoms. Preferably $R_1$ or $R_2$ is an alkanol group. More preferably, both $R_1$ and $R_2$ are alkanol groups. Particularly suitable alkanol amines include triisopropanolamine, triethanol amine, diethanolamine, monoethanolamine and ethyldiethanolamine. Triethanolamine is especially preferred.

The inhibitor is added to the vinyl chloride in an amount sufficient to inhibit polymerization of vinyl chloride in the recovery system. Depending on the efficiency of the inhibitor, this amount is normally about 50 to 300, preferably 75 to 150, parts per mililon parts by weight of vinyl chloride recovered.

The inhibitor may be added in accordance with any convenient method, such as by injecting an aqueous solution of the inhibitor into the stream of vinyl chloride vapor entering the recovery system. In recovery systems having a water-sealed vacuum pump or water-sealed compressor, a particularly convenient method of adding the inhibitor is to add it to the sealing water of the vacuum pump or the compressor or both if both are present.

The amount of inhibitor added to the sealing water is preferably the minimum amount which inhibits polymerization of vinyl chloride in the recovery system. Excess inhibitor should be avoided as it might tend to create a possible water pollution problem, as well as inhibit polymerization of recycled monomer. The amount of inhibitor to be added to the sealing water to produce a desired concentration of inhibitor in the vinyl chloride can be calculated from the amount of sealing water normally entrained in the vinyl chloride. Normally, however, the amount of inhibitor added to the sealing water is from about 1 to 10, preferably 3 to 5, percent by weight.

The invention is further illustrated by the following example, wherein all parts are by weight.

EXAMPLE

Unreacted vinyl chloride was recovered after polymerization in a recovery system comprising two vacuum pumps, two compressors, an impingement separator, and a condenser. The vacuum pumps and compressors were water sealed. Triethanol amine was added to the sealing water of the vacuum pumps and compressors at a concentration of about 4.0 percent by weight. In a typical day of operation, 120,000 parts of vinyl chloride were recovered through the recovery system. Three hundred fifty parts of sealing water were entrained with the vinyl chloride. Thus, the amount of triethanol amine entrained with the vinyl chloride was about 117 parts per million parts of vinyl chloride. However, the recovered vinyl chloride recycled to the reactor contained less than 0.1 part per million of triethanol amine.

The addition of triethanol amine to the sealing water was found to substantially reduce polymerization of vinyl chloride in the recovery system. This finding was based on a comparison of repeated runs using triethanol amine with repeated runs without using triethanol amine.

We claim:
1. In the polymerization of vinyl chloride in an aqueous medium wherein unreacted vinyl chloride is recovered after said polymerization through a recovery system wherein the vinyl chloride is separated from entrained water and condensed, the improvement of adding a non-toxic, water-miscible, vinyl chloride-immiscible polymerization inhibitor having a boiling point greater than about 150° C. to the vinyl chloride in said recovery system, said inhibitor being an alkanolamine having the formula $R_1R_2N(CH_2)_nOH$ wherein $n$ is 2 to 4 and $R_1$ and $R_2$ are independently hydrogen, an alkyl group of 1 to 4 carbon atoms or an alkanol group of 2 to 4 carbon atoms, said inhibitor being added in an amount sufficient to inhibit polymerization of vinyl chloride in said recovery system.

2. The improvement of claim 1 wherein the inhibitor is triethanol amine.

3. The improvement of claim 2 wherein the triethanol amine is added in an amount of 50 to 300 parts per million parts by weight of the vinyl chloride.

4. The improvement of claim 1 wherein the recovery system comprises a vacuum pump and a compressor, said vacuum pump or compressor being water-sealed, and the inhibitor is added to the sealing water of said vacuum pump or compressor.

5. The improvement of claim 4 wherein both the vacuum pump and the compressor are water-sealed and the inhibitor is added to the sealing water or both the vacuum pump and the compressor.

6. The improvement of claim 5 wherein the inhibitor is selected from the group consisting of monomethanol amine, diethanol amine, triethanol amine, and lower alkyl diethanol amines.

7. The improvement of claim 5 wherein the inhibitor is triethanol amine.

8. The improvement of claim 7 wherein the concentration of triethanolamine in the sealing water is between about 1 and 10 percent by weight.

9. The improvement of claim 8 wherein entrained water is separated from the vinyl chloride in an impingement separator and a condenser.

References Cited
UNITED STATES PATENTS

| | | | |
|---|---|---|---|
| 3,402,138 | 9/1968 | Albert et al. | 260—29.7 |
| 3,627,742 | 12/1971 | Kruse | 260—87.1 |
| 3,418,300 | 12/1968 | Nakajima et al. | 260—85.5 |
| 3,222,334 | 12/1965 | Demme | 260—84.7 |
| 3,594,359 | 7/1971 | Sharetsky et al. | 260—92.8 |
| 3,644,317 | 2/1972 | Lo Monaco et al. | 260—85.5 |
| 3,084,143 | 4/1963 | Hiesermann et al. | 260—85.5 |

JOSEPH L. SCHOFER, Primary Examiner

J. KIGHT III, Assistant Examiner